Oct. 26, 1965 J. MAURICE ETAL 3,213,988
HYDRAULIC CLUTCH WITH CUSHION MEANS
Filed Dec. 6, 1962 8 Sheets-Sheet 1

INVENTORS
JEAN MAURICE
RAYMOND LeBRISE

Oct. 26, 1965   J. MAURICE ETAL   3,213,988
HYDRAULIC CLUTCH WITH CUSHION MEANS
Filed Dec. 6, 1962   8 Sheets-Sheet 6

INVENTORS
JEAN MAURICE
RAYMOND LE BRISE
BY Irwin S. Thompson
ATTY.

FIG.21

Oct. 26, 1965    J. MAURICE ETAL    3,213,988
HYDRAULIC CLUTCH WITH CUSHION MEANS
Filed Dec. 6, 1962    8 Sheets-Sheet 8

INVENTORS
JEAN MAURICE
RAYMOND LE BRISE
By Irwin S. Thompson
ATTY.

United States Patent Office 3,213,988
Patented Oct. 26, 1965

3,213,988
HYDRAULIC CLUTCH WITH CUSHION MEANS
Jean Maurice, Paris, and Raymond Le Brise, Saint-Denis, France, assignors to Societe Anonyme Francaise du Ferodo, Paris, France, a corporation of France
Filed Dec. 6, 1962, Ser. No. 242,833
Claims priority, application France, Dec. 12, 1961, 881,676
23 Claims. (Cl. 192—86)

The present invention relates to clutches in which the friction surfaces work in a hydraulic fluid, for example oil, the control of engagement of the clutch being preferably hydraulic. The invention is especially applicable to clutches which are associated with hydro-kinetic transmission devices such as couplers and torque converters for the purpose of engaging or disengaging the intake shaft of a gear-box with the driven member of one of the said hydro-kinetic devices arranged before the said gear-box.

A hydraulic clutch according to the invention is especially characterized in that it comprises at least two driving plates, rigidly fixed together for rotation, of which one consitutes a cylinder receiving another which forms a piston, at least one of the said plates being movable axially, at least one driven disc which is disposed between the plates and which is provided on both its sides with annular friction linings, the outer diameter of which is substantially less than the diameter of the plates, an outer chamber filled with fluid and partly de-limited by the axially-movable plate, two inner chambers filled with fluid extending between the plates, one of the inner chambers known as the peripheral chamber surrounding the said linings while the other inner chamber known as the central chamber is surrounded by the said linings, the disc being elastically compressible in an axial direction in the zone of the linings so that the said linings generally maintain a barrier between the two inner chambers over a pre-determined travel of engagement in which the axially-movable plate is permitted to move nearer to the other plate between a position just in contact with the linings and a position in which the linings are gripped, fluid pressure means coupled to the outer chamber and to the central inner chamber and controlled at will so as to render the effects of pressure preponderant either on one side or on the other of the said axially-movable plate so as selectively to cause the engagement or the disengagement, and a fluid passage of pre-determined section coupling together the two inner chambers in order that the peripheral inner chamber can discharge towards the central inner chamber a controlled flow of fluid which defines the uniform progression of the engagement when the axially-movable plate passes from the position of touching contact to the clamping position.

This arrangement has the result of defining with accuracy the smooth progression of the engagement, which renders the operation much more stable and more reliable than in the hydraulic clutches proposed up to the present time, especially by reason of the absence of any variation in operation which would be due to a settling or wear of the surfaces and of the friction linings.

An elastic means is preferably applied to the axially-movable plate and acts in the direction of engagement.

The fluid passage of pre-determined section is advantageously formed in the disc and/or the friction linings.

In accordance with another particular feature, the fluid passage of pre-determined section has an orientated loss of pressure which is substantially higher in the direction peripheral inner chamber—central inner chamber than in the contrary direction.

This arrangement has the result of permitting at the same time gradual progressive engagements and complete and instantaneous disengagements so as to provide excellent operation of the clutch in all circumstances.

In a particularly advantageous application of the invention, the plates are fast for rotation with a turbine of a torque converter and the disc drives the intake shaft of a gear-box, the operating lever of which actuates the fluid pressure means so as to render the effects of pressure preponderant in the inner chambers in order to disengage the clutch both during the gear-changing operations and in neutral, and to render the effects of pressure preponderant in the outer chamber so as to maintain the clutch in engagement when a gear is left in the engaged position.

Forms of embodiment of the invention are described below by way of examples, reference being made to the accompanying drawings, in which:

FIG. 1 is a diagrammatic view of a hydraulic clutch according to the invention, in the disengaged position;
FIG. 2 is similar to FIG. 1, but in which the clutch is in course of engagement;
FIG. 3 is similar to FIG. 1, but in which the clutch is engaged;
FIG. 4 relates to an alternative form, in which an elastic means is added and acts in the direction of engagement;
FIG. 5 is concerned with a further alternative form, in which the fluid passage is provided in the disc;
FIG. 6 relates to a further alternative form in which the fluid passage is given an orientated pressure drop;
FIG. 9 is an operation diagram of the transmission.

Reference will first be made to the diagrammatic FIGS. 1 to 3. A hydraulic clutch E comprises a plate 10 rigidly fixed to a driving shaft 11 and constituting a cylinder, while a further plate 12, axially movable, forms a piston inside the cylinder of the plate 10 and is rigidly fixed for rotation with the plate 10 by any appropriate means, shown diagrammatically by a system of rods 13.

A disc 14 is fast for rotation with a driven shaft 15 and is disposed between the two driving plates 10 and 12. The disc 14 is provided on both its sides with annular friction linings 16, the external diameter of which is substantially less than the diameter of the plates 10 and 12. The linings 16 are continuous and are free from substantial joints so as to prevent any drag torque liable to increase the inertia of the system.

An outer chamber 17 is filled with fluid and is at least externally adjacent to the axially-movable plate 12, while two inner chambers 18 and 19, filled with fluid, extend between the plates 10 and 12. The chamber 18 is peripheral and surrounds the linings 16. The chamber 19 is central and is surrounded by the linings 16. Holes 14a are provided in the portion of the disc 14 which is surrounded by the linings 16, in order that the whole of the chamber 19 may form a unitary space having everywhere the same pressure.

The disc 14 is elastically compressible in an axial direction in the zone of the linings 16 so that the linings 16 generally maintain a barrier between the inner chambers 18 and 19 during a pre-determined travel of engagement S in which the plate 12 is permitted to approach the plate 10 between a position H of first linear contact with the linings 16 and a position G at which the linings 16 are gripped. A compressibility of this order is provided such that there is no permanent deformation and that the elasticity is uniform. In particular, the disc 14 is given a small section so as to avoid any risk of permanent deformation.

In the example shown in FIGS. 1 to 3, in view of such an axial compressibility of the disc 14, the plates 10 and 12 are made flat while the disc 14 is slightly conical in the position of rest (FIG. 1) and is elastically flattened into the position at which it is gripped between the plates (FIG. 3). As will be readily understood, the conicity of the disc such as this is shown in FIG. 1, has purposely been exaggerated as compared with reality with the object of facilitating the study of FIGS. 1 to 3. Alternatively, the disc could be flat in the position of rest and the plates cound be conical, such for example as has been shown in FIG. 12.

Fluid pressure means are coupled to the outer chamber 17 and to the inner central chamber 19 and are controlled at will so as to render the effects of pressure preponderant on one side or the other of the plate 12, in order to cause selectively engagement or disengagement of the disc.

In the example shown in FIGS. 1 to 3, these fluid pressure means comprise a pump 20 taking its suction from a tank 21, while a distributor 22 comprises on the one hand two conduits 23 and 24 coupled respectively to the pump 20 and to the tank 21, and on the other hand two conduits 25 and 26 coupled respectively to the outer chamber 17 and to the central inner chamber 19.

In addition, a fluid passage 27 having a predetermined section, shown diagrammatically by a calibrated orifice 28, couples together the inner chambers 18 and 19 in order that the chamber 18 can discharge towards the chamber 19 a controlled flow of fluid, defining the progression of engagement when the plate 12 passes from the linear contact position H to the gripped position G.

In the disengaged position (FIG. 1), the disc 14 is free between the plates 10 and 12. In order to engage, the distributor 21 is put into the position at which the conduits 23 and 25 are put into communication with each other and the conduits 26 and 24 are put into communication with each other. A preponderant pressure effect is developed in the outer chamber 17. The plate 12 first reaches the linear contact position H (FIG. 1) and then the engagement phase begins (FIG. 2). The fluid in the peripheral inner chamber 18 must necessarily follow the passage 27, controlled at 28, so as to be evacuated to the tank 21, and this defines the progressive character of the engagement. When the plate 12 reaches the position G of FIG. 3, the gripping action is complete; the clutch is engaged.

It results from the foregoing description that the disc 14 is not liable to be deformed in any permanent manner in respect of its properties of elasticity, while the wear on the linings 16 takes place in a uniform and regular manner. For this reason, the phase of progression is always obtained along the same travel S, so that the system of progression remains accurate and does not require any adjustment.

In order to disengage, the distributor 21 is put into the position at which the conduits 23 and 26 are put into communication with each other and the conduits 25 and 24 are put into communication with each other. A preponderant pressure effect is developed in the chambers 19 and 18 and the plate 12 moves away from the plate 10 until the disc 14 is completely disengaged (FIG. 1). The clutch is disengaged. It will be noted that the fluid intended for the chamber 18 follows the passage 27, controlled at 28.

In an alternative form (FIG. 4), the arrangement is similar to that which has just been described with reference to FIGS. 1 to 3, but there is provided in addition an elastic means which is applied to the plate 12 and which acts in the direction of engagement. This elastic means may comprise, for example, springs 29.

In another alternative form shown in FIG. 5, the arrangement is similar to that which has been described with reference to FIGS. 1 to 3, but the fluid passage 27' with a pre-determined section is in this case formed in the disc 14 and/or in the linings 16.

In a further alternative form shown in FIG. 6, the arrangement is similar to that which has been described with reference to FIGS. 1 to 3, but the fluid passage 27 is given an orientated pressure drop which is substantially higher in the direction chamber 18—chamber 19 than in the opposite direction, so that the engagements may be progressive while the disengagements are complete and instantaneous. For example, the passage 27 is composed of a portion 27a having the calibrated orifice 28, and a portion 27b having a large rate of flow and provided with a one-way valve 30.

Reference will now be made to FIGS. 7 to 12 which relate to an application of the clutch E to a transmission of an automotive vehicle comprising an internal combustion engine M, the driving shaft 31 of which drives the impeller P of a hydraulic torque converter C having a turbine T fixed for rotation with the plates 10 and 12 of the clutch E, while the disc 14 drives the intake shaft 15 of a gear-box B, the control lever L of which additionally actuates the fluid pressure means 20 and 23 so as to render the pressure effects preponderant in the inner chambers 18 and 19 in order to disengage the clutch E both during the operations of gear changing and in the neutral position and to render the pressure effects preponderant in the outer chamber 17 in order to maintain the clutch E engaged when a gear is left in the engaged position. It will be noted that such pressure effects resulting from effects which are both static from the pressure of the pump 20 and dynamic from the centrifugal force resulting from the speeds of rotation of the parts such as 33, 10, 12, 14 in which the fluid is in contact.

Figure 7:
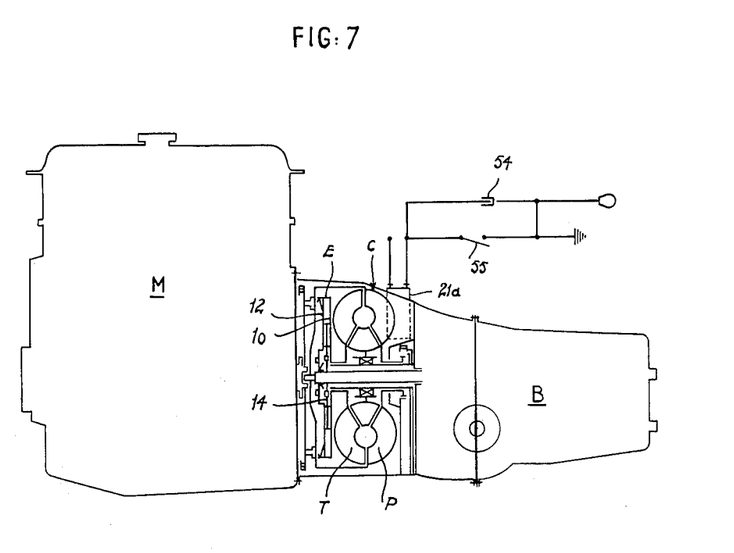
FIG. 7 shows diagrammatically a transmission of an automobile vehicle incorporating a clutch according to the invention.
Figure 8:
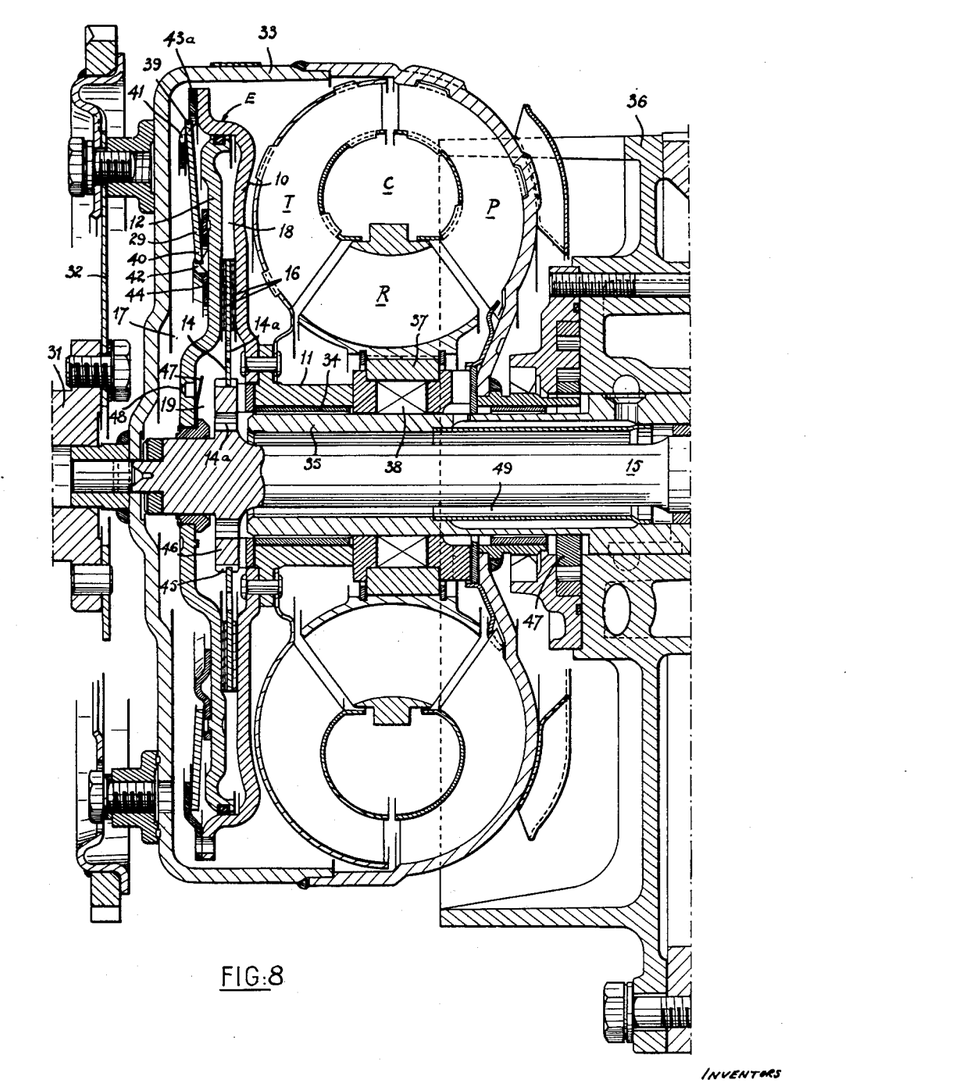
FIG. 8 is a view of a portion of this transmission, in longitudinal cross-section.

To the driving shaft 31 there is coupled through a flexible diaphragm 32, the bell 33 of the torque converter C, with which the impeller P is rigidly coupled. The turbine T is fixed to the driving portion 11 of the clutch E. The portion 11 consists of a hub which pivots through the intermediary of a journal 34 about a fixed sleeve 35. The latter is fast with the fixed casing 36 of the device and surrounds the driven shaft 15. The reactor R is coupled to a part 37 which is prevented from rotating in a direction opposite to the driving shaft 31 by a unidirectional coupling with a free-wheel 38, to the said sleeve 35.

In the vicinity of the shaft, the part 11 is rigidly fixed to the supporting plate 10 of the clutch E which is intended to couple or de-couple the turbine 2 with the driven shaft 15 automatically as a function of the conditions of operation of the gear-box B. It will be noted that the plate 10 is only coupled to the turbine T at its central portion, which gives it a great latitude of deformation elsewhere, and especially in the portion extending beyond the linings 16.

In the cylindrical peripheral portion of the plate 10 forming a drum of large diameter, is engaged the pressure-plate or piston 12, urged towards the plate 10 by the spring 29, which is in this case constituted by a Belleville washer. The latter comprises tenons 39 and 40 engaged respectively in windows 41 and 42 which are formed in washers 43 and 44 rigidly fixed to the plates 10 and 12 so as to play in addition the part of the rods 13 by ensuring the coupling in rotation of the said plates. The plates 10 and 12 are substantially flat at least in the portion corresponding to the chamber 18 so that they are rendered elastically deformable.

The friction disc 14 is of small diameter and is mounted on splines 45 formed round a small collar 46 on the shaft 15, which couples it in rotation with that shaft.

A disc 14 of this kind has the advantage of small inertia and a very low residual torque in the disengaged position, together with small overall axial dimensions. By reason of its small diameter, in order that it may be able to withstand large pressures of the order of 15 to 30 kg./sq. cm. for example, the linings 16 of the disc 14 are continuous and are made of impregnated paper, thus ensuring excellent operation with pressures of the order indicated, in particular when suitable cooling means are provided when the friction surfaces are engaged. These means may be provided according to the invention, for example by circulation of oil in the interior of and/or around the clutch, at least during the engagement period, as will be described in more detail below.

When the gear-box B is provided with synchronizing devices, the friction disc 14 according to the invention has a maximum diameter of 150 mm. and preferably less than 125 mm. in the case of road vehicles.

This maximum dimension is preferably adopted irrespective of the torque to be transmitted. The adaptation of the clutch to the torque will be obtained, if this is necessary, by utilizing several discs 14. The limitation of diameter is imposed by the low value of the drag torques which can be withstood at the present time by the conventional synchronizing devices of gear-boxes with sliding gears for road vehicles. These diameters could eventually be larger if the synchronizers were arranged to develop higher synchronizing torques.

Figures 10, 11:
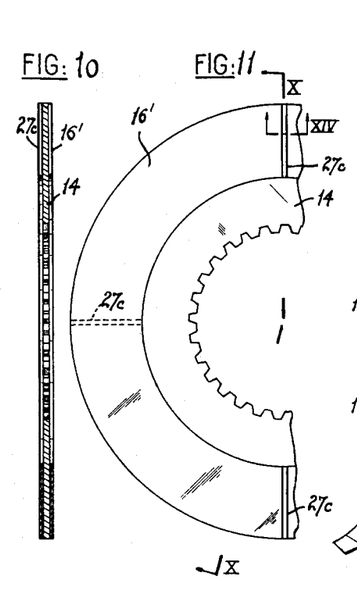
FIG. 10 is a view of the clutch disc of the transmission of FIG. 8, in cross-section taken along the line X—X of FIG. 11.
FIG. 11 is a partial view in elevation of this disc.

As shown in the example of FIGS. 1 to 3, the clutch E comprises round the periphery of the disc 14 and between the plates 10 and 12, a variable-volume chamber 18 containing oil, while the space surrounded by the linings 16 and comprised between the plates 10 and 12, it is provided with a chamber 19, also of variable volume and containing oil. Holes 14a are provided in the collar 46 and in the disc 14 so that the whole of the chamber 19 forms a single space having the same pressure everywhere. The peripheral chamber 18 communicates with places at lower pressure solely by the intermediary of the central chamber 19 and this by means of passages which in this case separate the friction surfaces. Such passages still exist in the engaged position and may consist of grooves 27 of small passage section, formed in the linings 16' (FIGS. 10 and 11).

The surfaces of the linings 16' of the friction disc 14 (FIG. 12) are in this case flat and are given a substantial elasticity, while the surfaces of the plates 10 and 12 which co-operate with the disc are slightly conical.

Figure 12:
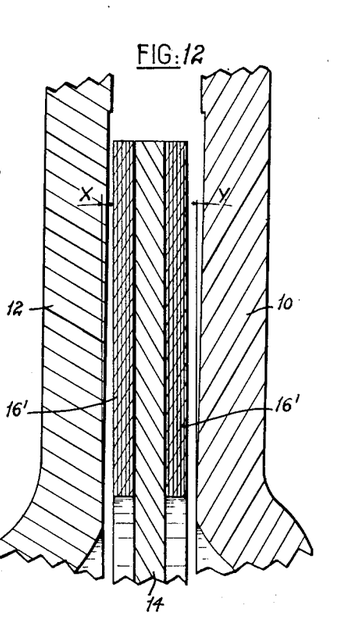
FIG. 12 is a view in section to a larger scale of the disc and the adjacent plates, in the disengaged position.

The conical surfaces of these plates in the case of a hydraulic control, are chosen so as not to be absolutely parallel and are made divergent in the direction moving away from the axis. For example, the moving surface which receives the operating pressure and forms the piston 12 has a cone which is slightly less accentuated than that of the fixed reaction surface 10. For example, there is provided a cone X of 1° on the movable surface 12 and a cone Y of 1°20′ on the fixed surface 10 (FIG. 12). By virtue of this arrangement, when the surfaces are deformed and applied against each other by the action of the pressure, the unitary load applied on the linings 16′ is substantially uniform and the wear is regular. The progression in operation is also satisfactory.

The clutch is advantageously constructed in such manner that, for a small axial displacement of the friction surfaces, the variation of the volume of the chamber 18 is large so as to drive a substantial quantity of oil between the friction surfaces, and this feature, permitted by the large radial extent of the chamber 18, is reinforced by the elasticity due to the substantially flat shape, to the large free surface and to the small thickness of the plates 10 and 12.

Figure 13:
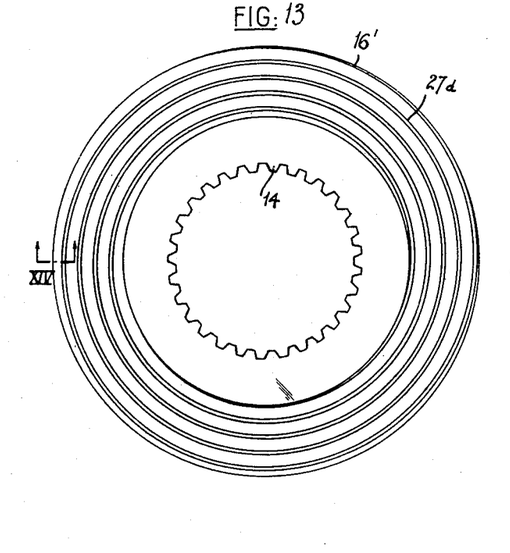
FIG. 13 is a view of an alternative form of disc.
Figure 14:
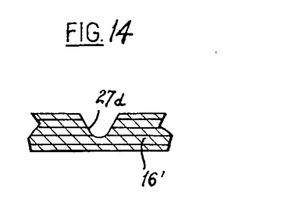
FIG. 14 is a view in section to a larger scale of the grooves of the discs of FIGS. 11 and 13, in the direction of the arrows XIV—XIV of FIG. 11 and of FIG. 13.

In the example shown in FIGS. 10 and 11, the control grooves 27c in the disc 14 are two in number, arranged diametrically opposite in each of the lingings 16′ and at 90° from one lining to the other. These control grooves 27c are radial and are formed only in the linings 16′ (see particularly FIG. 14), to the exclusion of the disc proper 14. This small number of grooves of small section makes it possible to control the wire-drawing of the oil between the chambers 18 and 19 with good results, whereas a larger number of grooves would result in an abrupt engagement which would only be limited by the elasticity, while the total absence of grooves would produce prolonged slip. In the alternative form shown in FIG. 13, the passage 27d consists of a spiral groove, and the direction of winding is provided so as to act in opposition to the delivery of the oil towards the centre when the disc 14 rotates faster than the turbine.

It should be observed in all cases that the large size of the piston 12 which causes the oil to flow back across the friction surfaces at the moment of engagement, in a manner which can be controlled by reason of the relatively large quantity of oil displaced, also makes it possible to apply a large force on the friction disc 14, when the control is hydraulic, even when utilizing hydraulic fluid at a low pressure (of the order of 3 to 5 kg./sq.cm., for example).

A circulation of oil is provided between the central chamber 19 and the outer chamber 17, which is in this case de-limited by the bell 33. This circulation is controlled by one or more one way valves or check valves 47 co-operating with small calibrated orifices 48. The central chamber 19 is furthermore coupled by a passage 49 included between the shaft 15 and the sleeve 35, to the conduit 26 coupled to the distributor 21a, in this case constituted by a solenoid valve (FIG. 9).

The other conduit 25 coupled to the solenoid valve supplies both the converted C and the outer chamber 17. The solenoid valve is supplied with oil under pressure by the conduit 23 which is connected to the pump 20 taking its suction from the tank 21. The conduit 23 is also connected to a discharge valve 50. The return of the various leakages to the tank 21 is effected by a series of conduits 24.

The solenoid valve is operated by an electro-magnet 51 and by an opposing spring 52. The excitation circuit 53 of the electro-magnet 51 comprises two switches in parallel: one switch 54 responsive to the gear-changing lever L and the other 55 controlled by the position of neutral of the gear-box B. The switch 54 is closed whenever the user seizes the lever L to change the gear and it is opened when the lever L is relinquished by the user.

The switch 55 is closed in the neutral position and is open when a gear is engaged.

When the electro-magnet 51 is de-excited, the solenoid valve occupies the position shown in FIG. 9. Oil under pressure at 23 supplies the conduit 25, the converter C, the chamber 17, and passes through the orifices 48 with a large drop of pressure. The clutch E is engaged. When the electro-magnet 51 is excited, especially when the lever L is actuated, the oil under pressure at 23 supplies the conduit 26, the space 49 and the chambers 19 and 18, the valves 47 closing. The clutch E becomes disengaged.

It will be appreciated that the particular form of clutch according to the invention, with hydraulic operation provided as shown (with friction disc of small diameter 14 and piston 12 of large diameter, forming at the periphery of the clutch a chamber 18 of variable volume containing a reserve of oil subjected to a larger variation of volume when the clutch is engaged) is particularly advantageous to ensure correct functioning of the engagement and disengagement operations under all conditions of utilization, and a clamping force proportional to the torque on the output shaft 15 of the clutch. For this reason, it is possible to engage and disengage the clutch under all conditions of use, without slip and without excessive force.

When changing to a lower gear in order to obtain rapid slowing down, it happens that the input shaft 11 of the gear-box B reaches 5,000 r.p.m. when disengaged, while the engine and the turbine have fallen to the idling speed, 500 r.p.m. for example, and it has been found with conventional clutches having friction discs of larger diameters and/or close to the diameter of the operating piston, that it was impossible to engage the friction surfaces. In fact, the oil inside the chamber rotated at a speed intermediate between 5,000 and 500 r.p.m. in the vicinity of 3,000 r.p.m., whereas the oil at the exterior rotated at a speed in the vicinity of 500 r.p.m. The force due to the difference of the pressures generated by centrifugal effects in the interior and at the exterior exceeded the force due to the operating pressure delivered by the pump. With a clutch in accordance with the invention, the dynamic pressures have an effect which is limited by the small diameter of the friction disc 26 rotating at high speed, while the force due to the operating pressure has its effect increased by the large surface area of the piston. Such an operation of changing to a lower gear would however be made impossible if, in consequence of an error of driving, the user attempted to do this while the vehicle was running at a high speed, since in that case the high speed of rotation of the disc 14 would prevent, by the effect of dynamic pressure, a dangerous re-engagement of the clutch.

In addition, it is necessary for the engagement to remain tolerable with an engine rotating at 5,000 r.p.m. which it is desired to couple with a stationary driven shaft, the turbine then rotating substantially at the speed of the engine. According to the invention, the engagement is correct by the effects due to centrifugal force being substantially balanced in the chamber 30 extending beyond the friction disc and only acting over a small diameter, being thus not liable to increase to a dangerous extent the operating force due to the maximum pressure delivered by the pump.

Reference will now be made to FIGS. 15 to 20, in which the arrangement is similar to that which has just been described with reference to FIGS. 7 to 14, but in which the fluid passage 27e is in the disc 14' as in the case of FIG. 5 and, as in the case of FIG. 6, has a pressure drop which is substantially higher in the direction chamber 18—chamber 19 than in the contrary direction.

The central part of the disc 14' is provided for this purpose with a number of ports 70, for example three, uniformly spaced apart (FIGS. 15 and 19) with circular symmetry and constituting the passage 27e.

Each port 70 (FIG. 19) is oblong and radial, and communicates with one of the holes 14a' in the disc 14'. It is provided with two lateral slots 71 at its extremity close to the periphery of the disc, which is widened in the form of a circle at 72.

Figure 16:
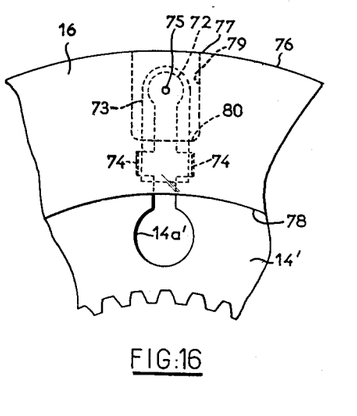
FIG. 16 is a partial view of the friction disc of this clutch, taken in elevation along the directions of the arrows XVI—XVI of FIG. 15.
Figure 17:
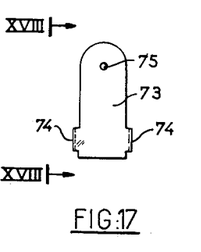
FIG. 17 is a view in elevation of one of the clappers of this disc.
Figure 18:
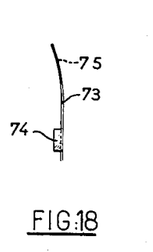
FIG. 18 is a profile view of the clapper taken in the direction of the arrows XVIII—XVIII of FIG. 17.
Figure 19:
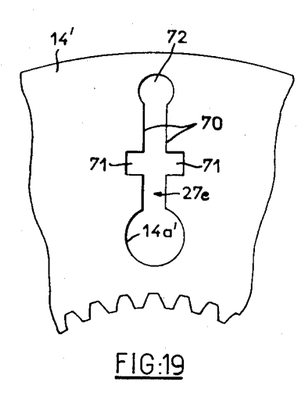
FIG. 19 is a partial view in elevation of the central part of the friction disc.
Figure 20:
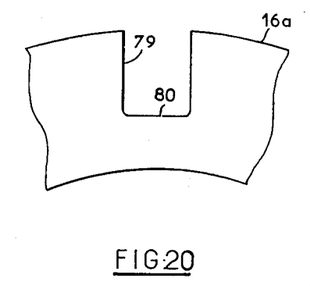
FIG. 20 is a partial view in elevation of an intermediate lining of the disc which does not participate in the friction.

On each port 70 is mounted a thin tongue 73, forming a valve (FIGS. 17 and 18). Each tongue 73 is provided with two feet 74 which are intended to be engaged in the slots 71 in order to position the tongues. The tongue overlaps a substantial portion of the port 70 (FIG. 16) from the wider extremity 72 up to beyond the positioning slots 71. Facing the extremity 72 of the port 70, the tongue 73 is provided with a small calibrated orifice 75.

The two linings 16 and an additional internal lining 16a have an annular shape and have their general outer contour 76 in coincidence with the periphery 77 of the disc 26, while their inner contour 78 is farther from the axis than the holes 14a, but nearer to the axis than the tongues 73 (FIG. 16). The additional inner lining 16a is adjacent to the tongues 73, and is provided with peripheral notches 79 (FIG. 20), arranged respectively opposite the tongues 73. Each notch 79 (FIG. 16) has a circumferential width greater than that of the corresponding tongue 73, so that the latter can freely disengage from the disc 14' and has a radial depth such that the bottom 80 of the notch is farther from the axis than the feet 74.

Figure 15:
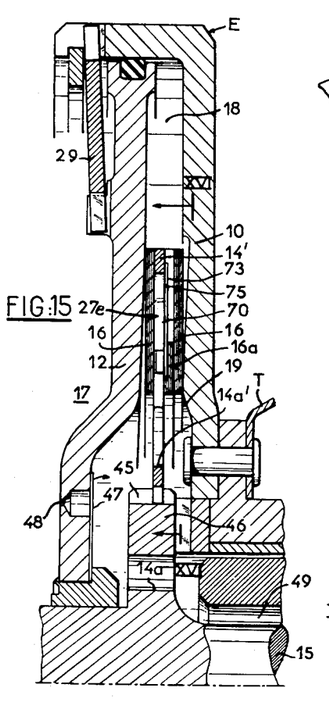
FIG. 15 is a half view in longitudinal section of an alternative form of clutch for the transmission shown in FIG. 8.

When the outer chamber 17 is put under pressure, while the conduit 49 is connected to discharge, a circulation of oil is produced between the outer chamber 17 and the inner central chamber 19 through the intermediary of the calibrated orifices 48 with clappers 47. The drop in pressure produced by these orifices has the effect that at every point of the plate 12 the pressure on the side of the chamber 17 is largely preponderant with respect to that at 18 and 19, and that all these pressures tend to keep the plate 12 close to the plate 10, accentuating the action of the Belleville washer 29. The clutch E is engaged.

In order to disengage the clutch, the conduit 49 is put under pressure. The valves 47 close and the pressures become preponderant in the chamber 19. By the operation of the invention, the fluid from the chamber 31, passing through the large ports 70 and pushing back the clappers 73 reaches the chamber 18 with a large rate of flow, that is to say instantaneously. By this means, the plate 12 is immediately moved away from the plate 10. The result is a rapid disengagement free from any delay, and in consequence of an excellent quality.

In order to re-engage the clutch, the chamber 17 is again put under pressure while the conduit 49 is connected to the discharge. The plate 12 is actuated and moves towards the plate 20 as has been indicated above. As long as there is no linear contact between the friction discs and the plates 10 and 12, the approach is rapid in all cases which is the desired condition. As soon as linear contact takes place, the engagement of the disc 14 between the plates 10 and 12 is effected in a progressive manner as and when a flow of oil is discharged from the chamber 18 to pass into the chamber 19. This flow is slow by reason of the presence of the tongues 73 applied against the disc 14', and of the small section of the orifices 75, selected for that purpose.

The process of engagement is thus spread over a certain time. This results in a progressive engagement favourable to smooth operation. In particular, there is no risk of any shock during starting.

Figure 21:
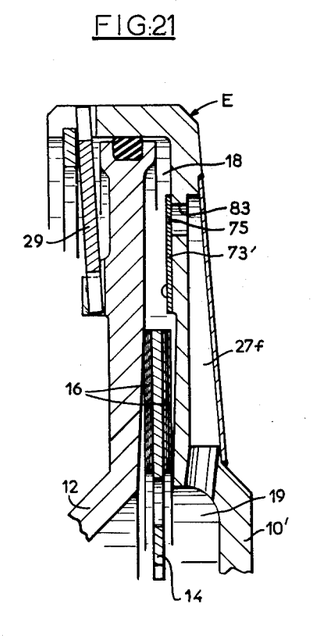
FIG. 21 relates to an alternative form, in which the fluid passage is formed in one of the plates.

In the alternative form shown in FIG. 21, the linings 16 of the disc 14 are not provided with notches and there is no additional inner lining 16a. The chamber 19 is coupled to the chamber 18 by the passage 27f which is in this case connected to the plate 10', and which communicates with one or a number of holes 83 formed in this plate. Over every hole 83 is fixed a tongue 73' having the same function as the tongue 73, and provided with a calibrated orifice 75.

As in the previous case, the tongues 73' open during the disengagements and make these latter positive and instantaneous, and close during re-engagements so as to compel fluid to pass through the small orifice 75 and thus to ensure a favourable progressive operation. It should be noted that the passage 27f could be formed in the plate 12, instead of in the plate 10'.

Reference will now be made to FIGS. 22 to 25, in which the disc 14" is provided, as in the case of FIGS. 15 to 20, with means defining a fluid passage means 27g having an orientated drop in pressure. The support of the disc 14" is of treated sheet steel without any weak sections, in particular along any radius, except for a single drilled hole of small diameter. This absence of weakened sections enables the fundamental qualities of elasticity of the disc to be maintained.

Figure 22:
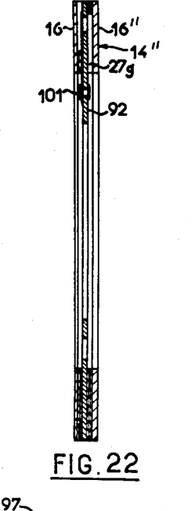
FIG. 22 is a view of an alternative form of the friction disc, taken in section along the line XXII—XXII of FIG. 23.
Figure 23:
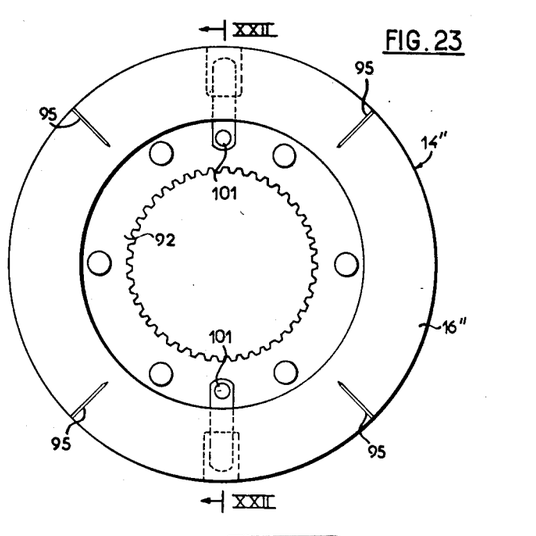
FIG. 23 is a view in cross-section of this alternative.

The disc 14" is composed of a flat central support 92 of steel, provided on one side successively with a first washer 93 and a second washer 16" forming a lining, and on the other side with a first washer 94 of the same nature as the washer 93 and a second washer 16" forming the lining.

The first intermediate washer 93 or 94 is made of a composition rich in asbestos fibre strongly impregnated with resin so as to be very little porous (composition suitable for the manufacture of certain friction linings). It is shaped by moulding with the hollow portions. During the course of their manufacture, the washers corresponding to these compositions are subjected to pressures which exceed 100 kg./sq. cm. in the hot or cold state; they can therefore easily withstand and during operation, pressures of the order of a few multiples of 10 kg./sq. cm. Their specific weight is of the order of 2 kg./cu. dm. The washers can readily be bonded to the steel of the support 92, but they may also be riveted without difficulty to the said support 92. The washers 93 and 94 could have any other appropriate nature.

The second washer 16", that is to say the outer or superficial lining forming a friction surface, has a base of paper containing a small percentage of asbestos and a high percentage of cellulose, with a slight impregnation of resin, maintaining the material with a high degree of porosity. This lining has a high coefficent of friction, especially in oil, and can withstand very high loads without substantial wear, provided that the temperature does not exceed 200° C. In the application considered for a turbine clutch, the circulation of oil ensures an excellent performance for this kind of lining.

The washer 16" is stuck on the washer 93 or 94 and this adhesion is very strong due to the fact that the resins employed in the various materials are selected with a similar or a compatible nature.

The outer faces of the lining 16" are made continuous, with the exception of the small radial grooves 95, which are made of shallow depth and short. In this way, the production of parasitic drags of any substantial nature is avoided.

Taking account of the direction of the conicity of the associated plates, the grooves 95 relating to one of the linings 16" are adjacent to the inner contour 96 of that lining and do not reach its outer contour 97, whereas the grooves 95 relative to the other lining 16" are adjacent to the outer contour 97 of that lining and do not reach its inner contour 96. The grooves 95 are intended to facilitate the separation of the disc 14" from the surfaces which, while they grip it in the engaged phase, are moved away from it during the disengagement. These grooves are blind since during the period of engagement proper they must not short-circuit the communication means provided with variable drop in pressure, depending on the direction of flow.

Figure 24:
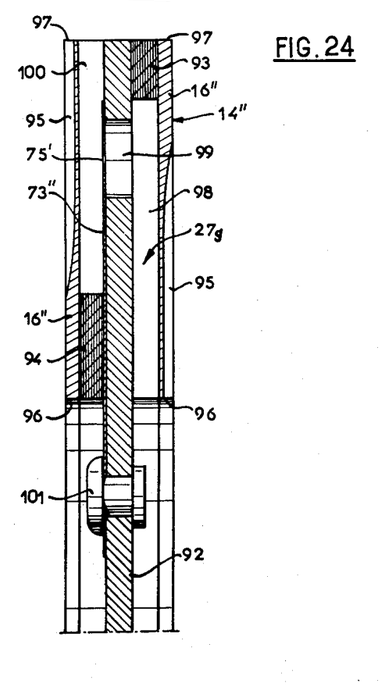
FIG. 24 is a detail view to a larger scale, of the alternative form shown in FIGS. 22 and 23.
Figure 25:
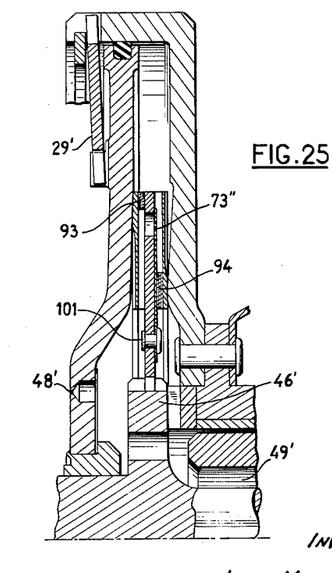
FIG. 25 is a view similar to FIG. 15 but showing the embodiment of FIGS. 22–24.

The means defining the fluid passage means 27f comprise means defining two diametrically-opposite passages. Each passage comprises in succession a portion 98 in the washer 93, a portion 99 in the metal support 92, and a portion 100 in the washer 94.

The portion 98 takes the form of a radial groove formed in the face of the washer 93 which is adjacent to the metallic support 92. The portion 99 takes the form of a hole of small size, preferably round, which passes right through the support 92, and which is remote from the contours of this support so as not to weaken this latter in any way nor to create lines of reduced strength in the support. The operation 100 takes the form of a radial groove formed in the face of the washer 94 which is adjacent to the metallic support 92.

It will be observed that the faces of the washers 93 and 94 which are in contact with the linings 16" are absolutely continuous, which ensures an excellent support for these linings.

An elastic metal blade 73" is interposed between the support 92 and the washer 93, and is provided with a portion forming a flap valve which extends into the groove 100 and which can move therein between a position at which the blade 73" is applied against the support 92 to cover the hole 99 completely, and a position at which the blade 73" is moved away from the support 92. A small calibrated orifice 75' is formed in the blade 73" in the part of this latter which is located opposite the hole 99. The bottom of the groove 100 has a shape and a length such that the blade 73", in the position at which the latter is moved away from the support 92, does not risk any permanent deformation.

In addition, the blade 93 comprises positioning means consisting of a rivet 101 fixed to the support 92 in such manner that the blade 73" always remains suitably positioned in the groove 100.

When the fluid circulates in the passage 27g, in the direction moving from the portion 98 to the portion 100, the fluid moves the valve portion of blade 73" away from and passes through the hole 99 having a section similar to that of the groove 98 and 100, that is to say without substantial drop in pressure. On the other hand, when the fluid circulates in the passage 27g in the other direction, it presses the valve portion of blade 73" against the support and can then only pass through the small calibrated orifice 75', which determines the large pressure drop which defines the progression.

What we claim is:

1. A hydraulic clutch comprising at least two driving plates fixed together for rotation, one of said driving plates constituting a cylinder and being adapted to receive another of said driving plates forming a piston, at least one of said driving plates being movable axially relative to the other of said driving plates, at least one driven disc disposed between said plates and provided on both its faces with annular friction linings the external diameter of which is substantially less than the diameter of said plates, an outer chamber filled with fluid and partially de-limited by the axially movable plate, two inner chambers extending between said plates, one of said inner chambers being a peripheral chamber and being filled with fluid and surrounding said linings, the other of said inner chambers being a central inner chamber and being surrounded by said linings, said disc having contact with said plates in a first position of said axially movable plate in which said linings establish a barrier between the two inner chambers, said disc being elastically deformable, said disc being gripped between said plates in a second position of said axially movable plate in which said plates are closer together than in said first position, said disc being deformed to maintain said barrier as said axially movable plate moves from said first position to said second position, fluid pressure means operatively connected to said outer chamber and to said central inner chamber and controllable at will so as to render the pressure effects preponderant on one side or the other of said axially movable plate for the purpose of effecting selectively engagement or disengagement of the clutch, and a fluid passage of predetermined section connecting together the two inner chambers so that said peripheral inner chamber may discharge toward said central inner chamber a controlled flow of fluid defining the progression of the engagement of the clutch when the axially movable plate moves from said first position to said second position.

2. A hydraulic clutch as claimed in claim 1, in which an elastic means is applied to the axially-movable plate, said means acting in the direction of engagement.

3. A hydraulic clutch as claimed in claim 1, in which said fluid passage of pre-determined section is formed at least in part in said friction linings.

4. A hydraulic clutch as claimed in claim 1, in which the ratio of the diameter of said plates to the outer diameter of said disc is comprised between 1.2 and 2.

5. A hydraulic clutch as claimed in claim 1, in which said disc has a diameter less than 150 mm.

6. A hydraulic clutch as claimed in claim 1, in which said friction linings are of impregnated paper and are subjected to pressures of the order of 15 kg./sq. cm. to 30 kg./sq. cm.

7. A hydraulic clutch as claimed in claim 1, in which said plates are slightly deformable in an elastic manner, at least in their portions adjacent to the peripheral inner chamber, so as to increase the volume of fluid expelled from said peripheral inner chamber towards the central inner chamber through the said pre-determined fluid passage during the engagement.

8. A hydraulic clutch as claimed in claim 7, in which, for the purpose of their elastic deformation, said plates are coupled to the driving portion of the clutch solely in the vicinity of the axis thereof.

9. A hydraulic clutch as claimed in claim 1, in which said plates are flat while the disc is slightly conical in the state of rest.

10. A hydraulic clutch as claimed in claim 1, in which said plates are slightly conical while the disc is flat in the state of rest.

11. A hydraulic clutch as claimed in claim 10, in which one of said plates has a conicity which is more accentuated than that of the other plate.

12. A hydraulic clutch as claimed in claim 1, in which said fluid passage of pre-determined section consists of a small number of grooves formed in the friction linings.

13. A hydraulic clutch as claimed in claim 12, in which said grooves are radial.

14. A hydraulic clutch as claimed in claim 12, in which said grooves are spiral.

15. A hydraulic clutch as claimed in claim 1, in which the outer faces of said linings are continuous and comprise shallow and blind radial grooves which do not extend into the portions of said linings which first enter into contact with said plates.

16. A hydraulic clutch as claimed in claim 1, in which a circulation of fluid is provided at least in the engaged position of said clutch and passes through a calibrated hole with a clapper which separates said outer chamber and said central inner chamber, and in which said fluid pressure means are adapted to put said outer chamber and said central inner chamber under pressure selectively.

17. A hydraulic clutch as claimed in claim 1, in which said plates are made fast for rotation together by a castellated washer which applies an elastic action in the direction of clamping on the axially-movable plate.

18. A hydraulic clutch as claimed in claim 1, in which said controlled flow of fluid passes through said disc.

19. A hydraulic clutch as claimed in claim 1, and valve means permitting flow of fluid in the direction from the central inner chamber to the peripheral inner chamber at a substantially greater flow rate than the flow rate of said controlled flow of fluid.

20. A hydraulic clutch as claimed in claim 1, in which said fluid passage of predetermined section comprises a large orifice, and a tongue carried by the disc and covering the large orifice and acting as a clapper and having a small orifice therethrough, so that the pressure drop is higher in the direction from the peripheral inner chamber to the central inner chamber than in the opposite direction.

21. A hydraulic clutch as claimed in claim 16, and means mounting the tongue on said disc.

22. A hydraulic clutch as claimed in claim 20, in which the said tongue is mounted in one of said plates.

23. A hydraulic clutch as claimed in claim 20, in which said disc comprises a central support of steel, intermediate washers of material rich in asbestos fibre and highly impregnated with resin, and superficial washers forming the friction linings with a base of mixed paper cellulose and asbestos lightly impregnated with resin, and in which said fluid passage of pre-determined section comprises blind grooves formed in said intermediate washers and a hole in the central support, while an elastic blade provided with a small calibrated orifice extends into one of said grooves and co-operates with said hole.

References Cited by the Examiner

UNITED STATES PATENTS 2,865,483 12/58 Livezey _______________ 192—86
2,939,557 6/60 Dabich et al. __________ 192—3.5

FOREIGN PATENTS 379,460 8/23 Germany.

DAVID J. WILLIAMOWSKI, *Primary Examiner.*